(12) United States Patent
Chen et al.

(10) Patent No.: US 6,346,136 B1
(45) Date of Patent: Feb. 12, 2002

(54) PROCESS FOR FORMING METAL NANOPARTICLES AND FIBERS

(76) Inventors: Ping Chen; Jianyi Lin; Xiaobin Wu; Bin Xue; Kuang Lee Tan, all of c/o INTRO, National University of Singapore, 10 Kent Ridge Crescent, Singapore 110260 (SG)

(*) Notice: Subject to any disclaimer, the term of this patent is extended or adjusted under 35 U.S.C. 154(b) by 0 days.

(21) Appl. No.: 09/539,783

(22) Filed: Mar. 31, 2000

(51) Int. Cl.⁷ .................................................. B22F 9/20
(52) U.S. Cl. ........................ 75/343; 75/362; 75/369; 75/371; 423/445 B
(58) Field of Search .................... 75/393, 362, 369, 75/371; 423/445 B

(56) References Cited

U.S. PATENT DOCUMENTS 5,695,734 A * 12/1997 Ikazaki et al. .......... 423/445 B
5,698,175 A * 12/1997 Hiura et al. ............ 423/445 B
5,919,429 A * 7/1999 Tanaka et al. .......... 423/445 B

FOREIGN PATENT DOCUMENTS

CA          1251326      *  4/2000

OTHER PUBLICATIONS

Ayyappan et al., J. Mater. Res., vol. 12, No. 2 (1997), pp. 398–401.
Paszti et al., Applied Surface science 109/110 (1997), pp. 67–73.
Kyotani et al., Chem. Commun., (1997), pp. 701–702.
Satishkumar et al., J. Phys. D: Appl. Phys, vol. 29 (1996), pp. 3173–3176.
Chen et al., J. Phys. Chem. B, vol. 103 (1999), 4559.

* cited by examiner

Primary Examiner—George Wyszomierski
(74) Attorney, Agent, or Firm—Birch, Stewart, Kolasch & Birch, LLP

(57) ABSTRACT

A method for forming metal particles and fibers, including: mixing at least one of nanotubes and nanofibers with at least one metal salt to form a mixture, and decomposing and reducing the mixture. The method of syntheses metal nanoparticles and fibers, such as Cu, Pd, Pt, Ag and Au nanoparticles and Cu sub-micron fibers, by using carbon nanotubes or carbon nanofibers as templates.

24 Claims, 6 Drawing Sheets

TEM image of as-prepared Pt samples.

Figure 1. TEM image of as-prepared Pd samples.

Figure 2. TEM image of as-prepared Pt samples.

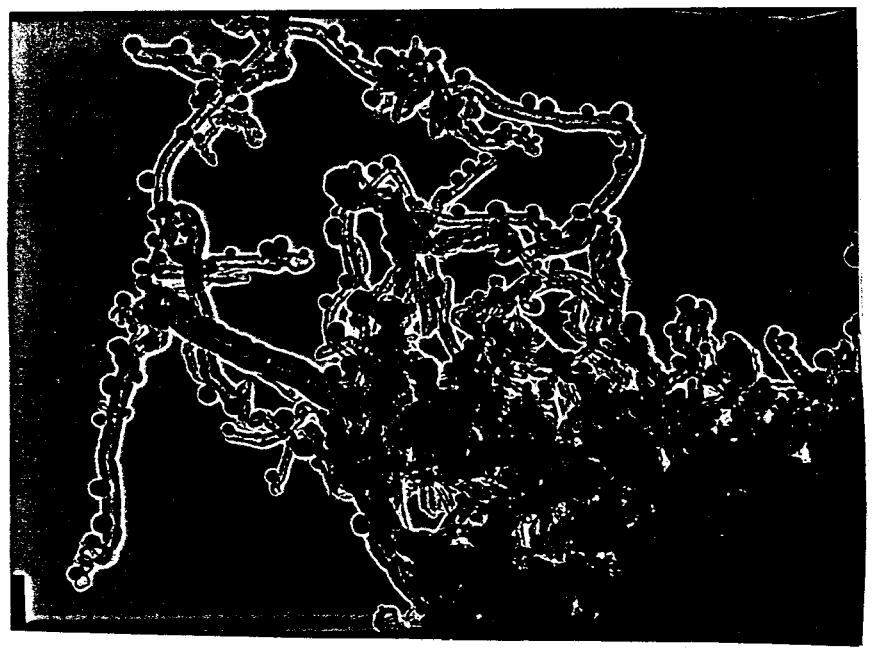
Figure 3. TEM image of Cu samples.

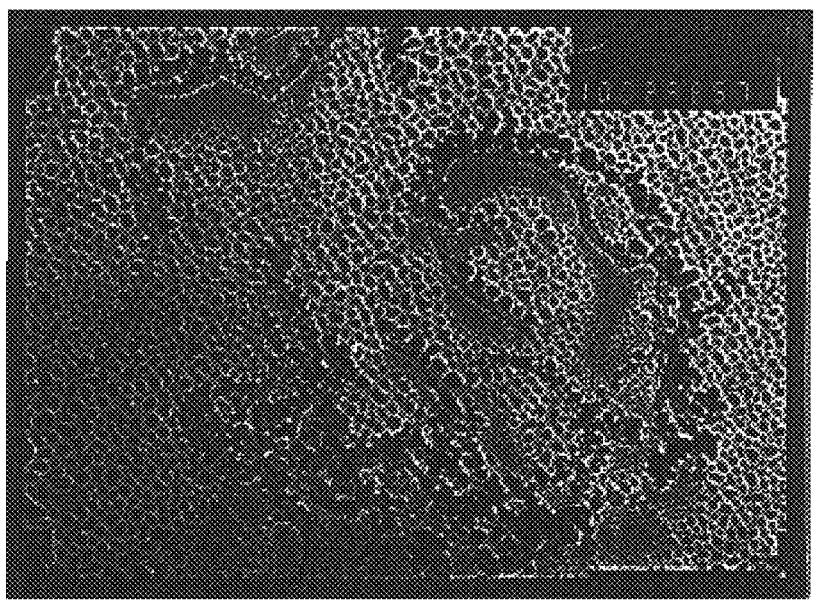
Figure 4. TEM image of Ag samples.

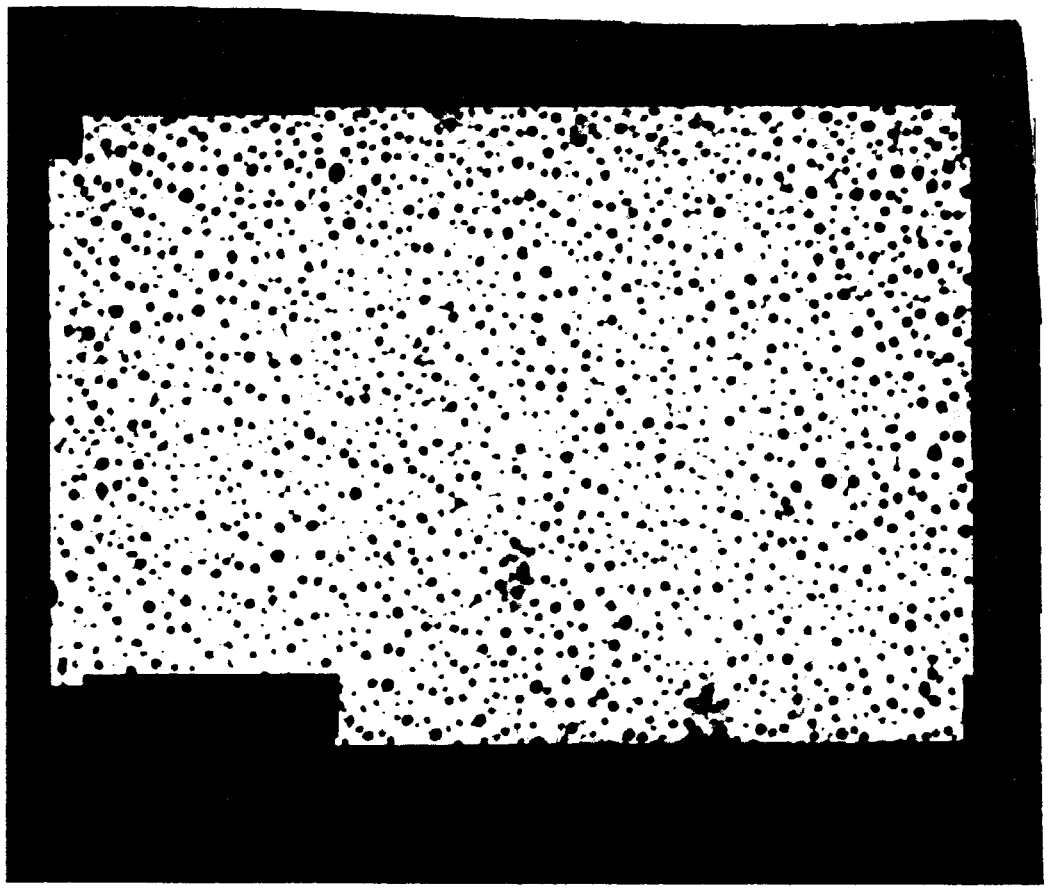
Figure 5 TEM image of Au samples.

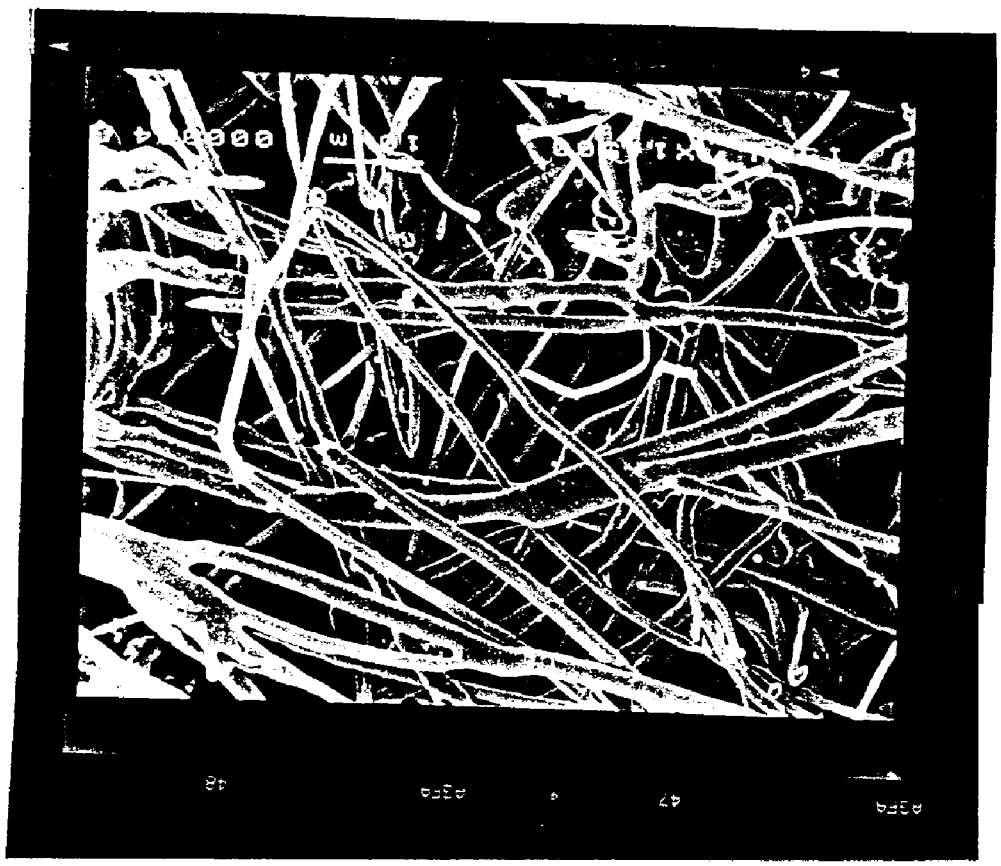
FIG. 6 SEM image of Cu fibers.

PROCESS FOR FORMING METAL NANOPARTICLES AND FIBERS

BACKGROUND OF THE INVENTION

1. Field of the Invention

The invention relates to a method of synthesis of metal nanoparticles and fibers, such as Cu, Pd, Pt, Ag and Au nanoparticles and Cu sub-micron fibers, by using carbon nanotubes or carbon nanofibers as templates.

2. Description of the Related Art

Metal nanoparticles are widely used in catalysis, electrical and optical devices and coatings etc. For example, Pt, Pd, Au, and Ag nanoparticles are excellent catalysts for hydrogenation of unsaturated hydrocarbons, complete oxidization of NO or CO, and dehydrogenation of alcohol etc. Au, Ag, and Cu thin films can be used as IR-deflection films in certain devices and show optical performance superior to other materials.

The following part of this section is a summary of the current methods known for the preparation of metal nanoparticles [1]:

1. Metal Evaporation at Low Pressure

In this method, bulk metal is evaporated in an Ar or He atmosphere under low pressure. The productivity, size and size distribution of the particles formed are all controlled by the way the metal is heated. Normally, metal particles with diameters ranging from 1 to 1000 nm can be obtained. However, this method is only suitable for low melting point materials.

2. Hydrogen Plasma-assisted Metal-melting

In this method, metal is melted by an arc generated between a hydrogen plasma and a metal. Ar, $N_2$ and/or $H_2$ dissolve in the molten metal, then release from the melt and transport ultra-fine metal particles.

3. Nanoparticles from Supersaturated Vapor

The supersaturated vapor method is the earliest method known for preparing nanoparticles. The process includes three steps: 1) production of a supersaturated vapor; 2) nucleation, growth and agglomeration of particles; and 3) collection of the particles. The most important step of this method is the generation of the supersaturated vapor. Until now, thermal evaporation, sputtering, electron beam evaporation, laser ablation, etc., have been applied in supersaturated vapor generation.

4. Metal Evaporation on the Surface of a Fluid

In this method, metal is evaporated under a high vacuum, then quenched in a specified fluid. Nanoparticles with controllable diameters can be obtained via this method. In addition, the size distribution of the particles is relatively narrow.

Recently, S. Ayyappan et al. reported that nanoparticles of Ag, Au, Pd and Cu could be obtained by the reduction of corresponding metal salts using ethyl alcohol as the reducing agent under refluxing conditions[2]. In order to control the formation of the metal colloids and to stabilize them, polyvinylpyrrolidone (PVP) was employed as a protective agent. However, considerable particle agglomeration was unavoidable. Such a problem was also encountered by Z. Paszti et al[3] in the production of Cu and Ag nanoparticles by using a laser ablation method.

The discovery of carbon nanotubes has generated great research activity worldwide. The morphology and tubular structure of this material enables it to function as a specific template in synthesizing nano-rods and nanoparticles. In most cases, the nano-rods and nanoparticles are formed inside the tube[4] or the tubes need acid pre-treatment[5].

According to embodiments of the present invention, some commonly used metal nanoparticles, such as Pd, Pt, Cu, Ag and Au were successfully prepared with diameters ranging from less than 5 to tens of nanometers, as were Cu sub-micron fibers, by using carbon nanotubes or nanofibers as templates.

SUMMARY OF THE INVENTION

The present invention is directed to a process for advantageously synthesizing metal nanoparticles and sub-micron fibers.

The method for forming metal particles and fibers, includes: mixing at least one of nanotubes and nanofibers with at least one metal salt to form a mixture; and decomposing the mixture.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are hereby incorporated in and constitute a part of this specification, illustrate embodiments of the invention and, together with the specification, serve to explain the principles of the invention.

In the drawings:

FIG. 1 is a TEM image of a Pd sample. The sample was prepared by mixing 1 mol % of $PdCl_2$ with carbon nanotubes (average diameter~25 nm), followed by decomposition and reduction under an $H_2$ atmosphere at 773 K.

FIG. 2 is a TEM image of a Pt sample. The sample was prepared by mixing 3 mol % of $HPtCl_4$ with carbon nanotubes (average diameter~25 nm), followed by decomposition and reduction under an $H_2$ atmosphere at 773 K.

FIG. 3 is a TEM image of a Cu sample. The sample was prepared by mixing 5 mol % of $CuCl_2$ with carbon nanotubes (average diameter~25 nm), followed by decomposition and reduction under an $H_2$ atmosphere at 873 K.

FIG. 4 is a TEM image of an Ag sample. The sample was prepared by mixing 5 mol % of $AgNO_3$ with carbon nanofibers (average diameter~30 nm), followed by decomposition and reduction under an $H_2$ atmosphere at 773 K.

FIG. 5 is a TEM image of an Au sample. The sample was prepared by mixing 5 mol % of $HAuCl_4$ with carbon nanotubes (average diameter~25 nm), followed by decomposition and reduction under an $H_2$ atmosphere at 773 K.

FIG. 6 is a TEM image of a Cu sample. The sample was prepared by mixing 30 mol % of $CuCl_2$ with carbon nanotubes (average diameter~25 nm), followed by decomposition and reduction under an $H_2$ atmosphere at 873 K.

DETAILED DESCRIPTION OF THE PREFERRED EMBODIMENTS

Reference will now be made to the preferred embodiments of the present invention, examples of which are illustrated in the accompanying drawings.

The advantages discussed above may be achieved by using carbon nanotubes or carbon nanofibers as templates in the synthesis process. The synthesis process comprises the thorough mixing of carbon nanotubes or carbon nanofibers with solvated metal salt precursors, followed by calcination and reduction of the above mixture at an elevated temperature and under a flow of inert or reductive gas.

According to one embodiment of the present invention, there is provided a method of thoroughly mixing carbon nanotubes or nanofibers with solvated metal salts comprising dissolving a certain amount of metal salts in a suitable solvent, adding carbon nanotubes or carbon nanofibers to the solution and subsequently subjecting the solution to an ultrasonic treatment followed by stirring at an elevated temperature.

According to another embodiment of the present invention, there is also provided a method including decomposition and reduction of the mixed material further including heating the mixture in a flow of inert or reductive gas at a desired temperature.

Additional information concerning embodiments of the present invention is contained in P. Chen et al., Journal of Physical Chemistry B, 103, 4559 (1999) [6], the entire contents of which are hereby incorporated herein by reference. For instance, the above procedure may be performed in such a way that the metal particles do not stick strongly to the nanotubes, and can be easily seperated from the nanotubes by ultrasonic treatment. Additional features and advantages of the present invention will be set forth in the description and figures which follow, and in part will become apparent from the description and figures.

Preferably, carbon nanotubes or carbon nanofibers used in embodiments of the present invention are prepared by catalytic disproportionation of CO (carbon nanotubes) or by catalytic decomposition of $CH_4$ (carbon nanofibers) on a Ni- or Co-based catalyst. After purification, about 75% or more of the product is advantageously in the form of nanotube or nanofibers. The structural properties of graphene layers in carbon nanotubes and carbon nanofibers are similar to those of graphite, but with greater interlayer distance: 0.345 nm for both carbon nanotubes and carbon nanofibers, compared with 0.335 nm for graphite. Both carbon nanotubes and nanofibers can reach several microns in length, but only a few to tens of nanometers in diameter.

Preferably, the metals are transition metals. They may be, for example, Cu, Pd and/or Pt as well as Ag and/or Au etc.

The metal salt precursors are selected from metal halides or their derivatives, nitrates, carbonates, acetates, and/or corresponding organometallic compounds. The molar ratio of metal to the carbon materials in the case of preparation of metal nanoparticles is preferably from about 1:1000 to 1:1, more preferably from 1:100 to 1:5; while for metal submicron fibers, it is preferably from about 1:20 to 5:1, more preferably from 1:10 to 2:1.

Preferably, the solvent for dissolving metal salts is selected from water, alcohols, phenols, aldehydes, esters, ketones, aromatic hydrocarbons, ethers, etc.

The mixing of carbon nanotubes or nanofibers with metal salt precursors is preferably carried out by ultra-sonic treatment. Optionally, a subsequent strong stirring at a desired temperature may be carried out.

In certain embodiments, the ultra-sonic and stirring treatment is performed in a temperature range between room temperature and 473 K.

The decomposition and reduction of the mixture of metal salts and carbon nanotubes or nanofibers are carried out in a temperature range between room temperature and 1073K, depending on the metal salts used. Typical conditions are between room temperature and 873 K, more typically between room temperature and 773 K, for Ag under inert or reductive atmospheres. Typical conditions are between room temperature and 1073 K, more typically between 373 and 973 K, for the other metals listed herein under inert or reductive atmospheres.

In certain embodiments, the inert gases are selected from He, $N_2$, Ar, etc.. The reductive gases include $H_2$ or $H_2$-containing gases.

The following specific examples are provided to illustrate several embodiments of the present invention. It will be understood, however, that the specific details given in each example have been selected for the purposes of illustration and are not to be construed as limitations on the invention.

EXAMPLE 1

300 mg of carbon nanotubes, with an average diameter of 20 nm, and a 1 molar % solution of $HPdCl_4$ were fully dispersed and dissolved into water by ultrasonic treatment. Then, the above suspension was subjected to strong stirring at 353 K until all of the solvent was evaporated. The dried mixture was then calcined under an $H_2$ atmosphere at 773K for half an hour and collected at room temperature. Pd particles with an average size of about 7 nm were obtained.

EXAMPLE 2

300 mg of carbon nanofibers, with an average diameter of around 30 nm, and a 3 molar % solution of $HPtCl_4$ were put into acetone. Then, following the same procedure as in Example 1, Pt nanoparticles with an average size of around 10 nm were obtained.

EXAMPLE 3

300 mg of carbon nanofibers, with an average diameter of 30 nm, and a 5 molar % solution of $CuCl_2.6H_2O$ were put into water. Then, following the same procedure as in Example 1, Cu nanoparticles with diameters ranging from less than 5 nm up to 50 nm were obtained.

EXAMPLE 4

300 mg of carbon nanofibers, with an average diameter of 25 nm, and a 5 molar % solution of $AgNO_3$ were put into water. Then, a procedure similar to that of Example 1 was followed, but the calcination was carried out at 573K. Ag nanoparticles with an average diameter of around 20 nm were obtained.

EXAMPLE 5

300 mg of carbon nanofibers, with an average diameter of 25 nm, and a 5 molar % solution of $HAuCl_4$ were put into water. Then, following a procedure similar to that of Example 1, Au nanoparticles with an average diameter of around 10 nm were obtained.

EXAMPLE 6

300 mg of carbon nanofibers, with an average diameter of a 30 nm, and a 30 molar % solution of $CuCl_2.6H_2O$ were put into water. Then, following the same procedure as in Example 1, Cu fibers with diameters ranging from 200 nm to 5 microns were obtained.

REFERENCE (1) "Nanophase Materials: Synthesis-Properties-Applications", Ed. Hadjipanayis G and Siegel R., Kluwer Academic Publishers, 1994.
(2) Ayyappan S.; Srinivasa Gopalan R.; Subbanna G. N.; Rao C. N. R.; *J Mater Res.* 1997, 12, 398.
(3) Paszti Z.; Horvath Z. E.; Peto G.; Karacs A.; Guczi L. *Appl Surf Sci.* 1997, 109, 67.
(4) Kyotani T.; Tsai L F.; and Tomita A.; *Chem Comm.* 1997, 7, 701.

(5) Satishkumar B C.; Vogle E M.;Govindaraj A.; and Rao CNR.; *J of Phys D*. 1996, 29, 3171.
(6) Chen, P.; Wu, X.; Lin, J.; and Tan, K. L.; *J. Phys. Chem. B*. 1999, 103, 4559.

What is claimed is:

1. A method for forming metal particles and fibers, comprising:
   mixing at least one of carbon nanotubes and carbon nanofibers with at least one metal salt to form a mixture; and
   heating the mixture in a reducing gas or inert gas atmosphere to obtain metal particles or metal fibers.
2. The method of claim 1, wherein the metal particles and fibers comprise nanoparticles and sub-micron fibers.
3. The method of claim 1, wherein the metal particles comprise at least one of Ag, Au, Pd, Pt and Cu.
4. The method of claim 1, wherein the metal fibers comprise Cu fibers.
5. The method of claim 1, wherein the mixing step further comprises:
   fully dissolving a certain amount of the metal salts in a solvent, thereby forming a solution;
   dispersing the nanotubes and nanofibers into the solution by ultrasonic treatment, thereby forming a mixture; and
   strongly stirring the mixture at an elevated temperature.
6. The method of claim 5, wherein metal particles are formed and a molar ratio of metal to carbon of from 1:100 to 1:1 is present in the mixture.
7. The method of claim 5, wherein metal fibers are formed and a molar ratio of metal to carbon of from 1:20 to 5:1 is present in the.
8. The method of claim 5, wherein the solvent is at least one of distilled water, alcohol, ketones, aromatic compounds, esters and aldehydrates.
9. The method of claim 5, wherein the temperature of strong stirring is from room temperature to 473 K.
10. The method of claim 1, wherein the metal salt is one or more selected from the group consisting of halogenides, halogenide derivatives, nitrates, acetates and organometallic compounds.
11. The method of claim 1, wherein the carbon nanotubes comprise single and/or multiple walls and have an average diameter of between 1 and 50 nm.
12. The method of claim 1, wherein the carbon nanofibers have an average diameter of between 10 and 100 nm.
13. The method of claim 1, wherein the mixture is heated under an atmosphere of an inert gas.
14. The method of claim 13, wherein the mixture is heated to between room temperature and 1073 K.
15. The method of claim 13, wherein the inert gas is at least one of $N_2$, Ar and He.
16. The method of claim 1, wherein the mixture is heated under an atmosphere of a reducing gas.
17. The method of claim 16, wherein the mixture is heated under a flow of reducing gas at an elevated temperature.
18. The method of claim 17, wherein the reducing gas is at least one of $H_2$ and $H_2$-containing gases.
19. The method of claim 17, wherein the mixture is heated to between 293 K and 1083 K.
20. The method of claim 17, wherein the reducing gas is at least on of $H_2$ and $H_2$-containing gases.
21. The method of claim 16, wherein the mixture is heated to between 293 K and 1083 K.
22. A method for preparing a metal particle or fiber comprising:
   i) mixing at least one of carbon nanotubes or carbon nanofibers with a solution of a metal salt;
   ii) reducing the metal salt to the corresponding metal, thereby depositing the metal on the carbon nanotubes or carbon nanofibers to form metal particles or fibers;
   iii) separating the carbon nanotubes or carbon nanofibers from the metal particles or fibers; and
   iv) collecting the resulting metal particles or metal fibers.
23. The method of claim 22, wherein metal nanoparticles are collected.
24. The method of claim 22, wherein the separating step is performed by ultrasonic separation.

* * * * *